(12) United States Patent
Martins et al.

(10) Patent No.: US 12,446,805 B2
(45) Date of Patent: Oct. 21, 2025

(54) PALM DEVICE FOR NON-INVASIVE COLLECTION OF BIOMARKERS IN LIVING BEINGS

(71) Applicant: José Antonio Martins, Itapira— São Paulo (BR)

(72) Inventors: José Antonio Martins, Itapira— São Paulo (BR); Vanderlei Pereira Ferreira, Mogi das Cruzes— São Paulo (BR)

(73) Assignee: José Antonio Martins, São Paulo (BR)

( * ) Notice: Subject to any disclaimer, the term of this patent is extended or adjusted under 35 U.S.C. 154(b) by 396 days.

(21) Appl. No.: 18/033,061

(22) PCT Filed: Oct. 14, 2021

(86) PCT No.: PCT/BR2021/050448
§ 371 (c)(1),
(2) Date: Apr. 20, 2023

(87) PCT Pub. No.: WO2022/082284
PCT Pub. Date: Apr. 28, 2022

(65) Prior Publication Data
US 2023/0389836 A1     Dec. 7, 2023

(30) Foreign Application Priority Data
Oct. 23, 2020  (BR) .................. 10 2020 021765 8

(51) Int. Cl.
*A61B 5/1455*   (2006.01)
*A61B 5/00*     (2006.01)

(52) U.S. Cl.
CPC .............. *A61B 5/1455* (2013.01); *A61B 5/68* (2013.01); *A61B 2560/0406* (2013.01); *A61B 2560/0462* (2013.01)

(58) Field of Classification Search
CPC .............. A61B 5/1455; A61B 5/14551; A61B 5/14552; A61B 5/68; A61B 5/6806;
(Continued)

(56) References Cited

U.S. PATENT DOCUMENTS 5,990,866 A * 11/1999 Yollin ................. G06F 3/03545
                                                   345/157
6,101,405 A *  8/2000 Yasuda ................ A61B 5/1172
                                                   600/344
(Continued)

FOREIGN PATENT DOCUMENTS

JP         4189322        12/2008

OTHER PUBLICATIONS

International Search Report for International Application No. PCT/BR2021/050448, pp. 1-3, Dec. 16, 2021.
(Continued)

*Primary Examiner* — Eric F Winakur

(57) ABSTRACT

A device (1) whose body (2) due to its convex design (5) makes it anatomical with the palm of the hand of the target individual, who will place it on a collection adapter (10) with medium-sized hollow (12), conducive to the concentration of blood without interrupting the blood flow, which will be submitted for analysis of biomarkers performed in the chamber (9) of the optical system inside the body (2).

1 Claim, 10 Drawing Sheets

(58) Field of Classification Search
CPC .......... A61B 5/6825; A61B 2560/0406; A61B 2560/0462
See application file for complete search history.

(56) References Cited

U.S. PATENT DOCUMENTS

| | | | |
|---|---|---|---|
| 6,122,042 | A | 9/2000 | Wunderman et al. |
| 7,787,924 | B2 | 8/2010 | Acosta et al. |
| 9,277,880 | B2 | 3/2016 | Poeze et al. |
| 9,572,513 | B2 | 2/2017 | Yi et al. |
| 10,117,619 | B2 * | 11/2018 | Kobayashi ......... A61B 5/14552 |
| 10,149,623 | B2 | 12/2018 | Shimuta |
| 10,627,405 | B2 | 4/2020 | Momose et al. |
| 2015/0112170 | A1 | 4/2015 | Amerson, III et al. |

OTHER PUBLICATIONS

Written Opinion (English Translation) for International Application No. PCT/BR2021/050448, pp. 1-3, Dec. 16, 2021.

* cited by examiner

PALM DEVICE FOR NON-INVASIVE COLLECTION OF BIOMARKERS IN LIVING BEINGS

The present patent of invention refers to a device designed for the non-invasive collection of biomarkers in living beings which is mounted on a body anatomically designed for said collection to be carried out in the palm of the hand using optical concepts.

FIELD OF THE INVENTION

The invention in question is applied in the segment of clinical diagnoses, and can be used in health clinics, consulting rooms, establishments specialized in personalized human and animal nutrition.

TECHNICAL GROUNDS

According to studies carried out using a hyperspectral thermal chamber, with a view to discovering which area of the human body has greater vascularization, it was indirectly concluded that there is greater tissue vascularization of the region tested by the increase in temperature thereof. The empirical result demonstrated that the palm of the hand is more vascularized than the finger.

Therefore, it is recommended that the hand be used, preferably the left hand, for a pre-defined collection time with a view to achieving the stability of the bodily system of the target individual during the acquisition of the data with the device now claimed.

STATE OF THE ART

The current state of the art anticipates some patent documents which refer to non-invasive analysis devices by means of a beam of light, such as U.S. Pat. No. 9,277,880 entitled "Multi-stream data collection system for noninvasive measurement of blood constituents"—uses a source comprising LEDs that emit light in wavelengths from 1640 nm to 1665 nm. In one embodiment, the detector comprises a plurality of photodetectors arranged in a special geometry, preferably a substantially linear grid geometry.

The device of the document above makes different analyses of the blood, inclusive glucose, however the data collection is carried out in a linear capsule where the photodetectors are arranged in a thimble configuration. Although the thimble has a spring that enables the adjustment thereof to different finger anatomies, there is still the drawback of the areas without covering where ambient light causes noise in the photodetectors interfering with the results. Furthermore, the device is compact.

Document US 20150112170 entitled "DEVICE AND METHOD FOR NON-INVASIVE GLUCOSE MONITORING"—device for non-invasively measuring analytes in a biological being, such as, but not limited to, glucose levels in the blood in a human being, by means of terahertz radiation emitted through biological tissue. Terehertz pulses are emitted from a miniaturized quantum cascade laser to a fiber optic array into the wrist of the user. A corresponding sensor on the opposite side of the wrist receives the terahertz signals that have been modified by interacting with organic molecules. The data from the sensor is compiled and analyzed on a RAM chip and logic chip, where a program uses an algorithm to compare measurements to a library of existing measurements and topographic maps generated when the user first dons the device. Once the algorithm has analyzed all the data points, a value, such as blood glucose level, appears on a display of the device.

Despite using a laser as its measuring means, the data collection point of the device from the document above is the wrist of the user. This device is not a compact instrument either.

Document JP 4189322 entitled "Compact instrument for non-invasive measurement of glucose by near infrared spectroscopy"—The instrument is a spectrometer-based system that is attached to a human continuously or semi-continuously and collects spectral measurements that are used to determine a biological parameter in the sample tissue. The preferred target for analyzing is glucose. The sampling module can be carried out on the fingers, on the palm of the hand, base of the thumb, forearm, back of the forearm, arm, head, ear lobe, eyes, tongue, chest, trunk, abdomen area, thigh.

Besides not being compact, the apparatus of the document is a board that allows the passage of ambient light, leading to negative effects in the results.

OBJECTIVES OF THE INVENTION

It is an objective of the present invention to propose a device for the non-invasive collection of biomarkers that uses the palm of the hand as a point for acquiring data;

It is an objective of the present invention to propose a collection device whose upper convex design when laid over by the hand avoids the incidence of ambient light in the chamber of the optical system;

It is an objective of the present invention to propose a collection device capable of providing greater accuracy in the analyses, by resolving noise arising from the access of ambient light into the chamber of the optical system;

It is an objective of the present invention to propose an anatomical collection device capable of promoting greater comfort to the target individual during data acquisition;

It is an objective of the present invention to propose a collection device having a more simplified structure, since it does not require protections to prevent ambient light from entering into the optical system;

It is an objective of the present invention to propose a non-invasive, universal calibration collection device that enables the instrument to be shared among different individuals;

It is an objective of the present invention to propose a collection device having an optimal cost×benefit ratio.

SUMMARY OF THE INVENTION

The invention refers to a non-invasive collection device used to acquire data to measure biomarkers of interest. The device is mounted on a compact and anatomical body for seating the palm of the hand on the collection adapter located at its top, a body capable of housing an optical system chamber comprising a support for a photoelectric sensor, a set of LEDs and lens. The collection adapter has a medium-sized hollow for the passage of the beam of light originating from the set of LEDs towards the palm of the hand of the target individual which lies between 5 and 10 mm from the photoelectric sensor. The device is calibrated in a non-invasive manner prior to each collection, coupling a standard calibrator to the lid of the photoelectric sensor.

Accordingly, the target individual should be positioned such that his or her left hand resting on the device is at chest height. For one to three minutes, the device will emit a beam of light, which will be reflected onto the human tissue and subsequently captured by the photoelectric sensor.

DESCRIPTION OF THE DRAWINGS

The invention will next be described in its embodiment form, and for improved understanding, references will be drawn to the accompanying drawings, in which the following are represented.

DETAILED TECHNICAL DESCRIPTION OF THE INVENTION

Figure 1:
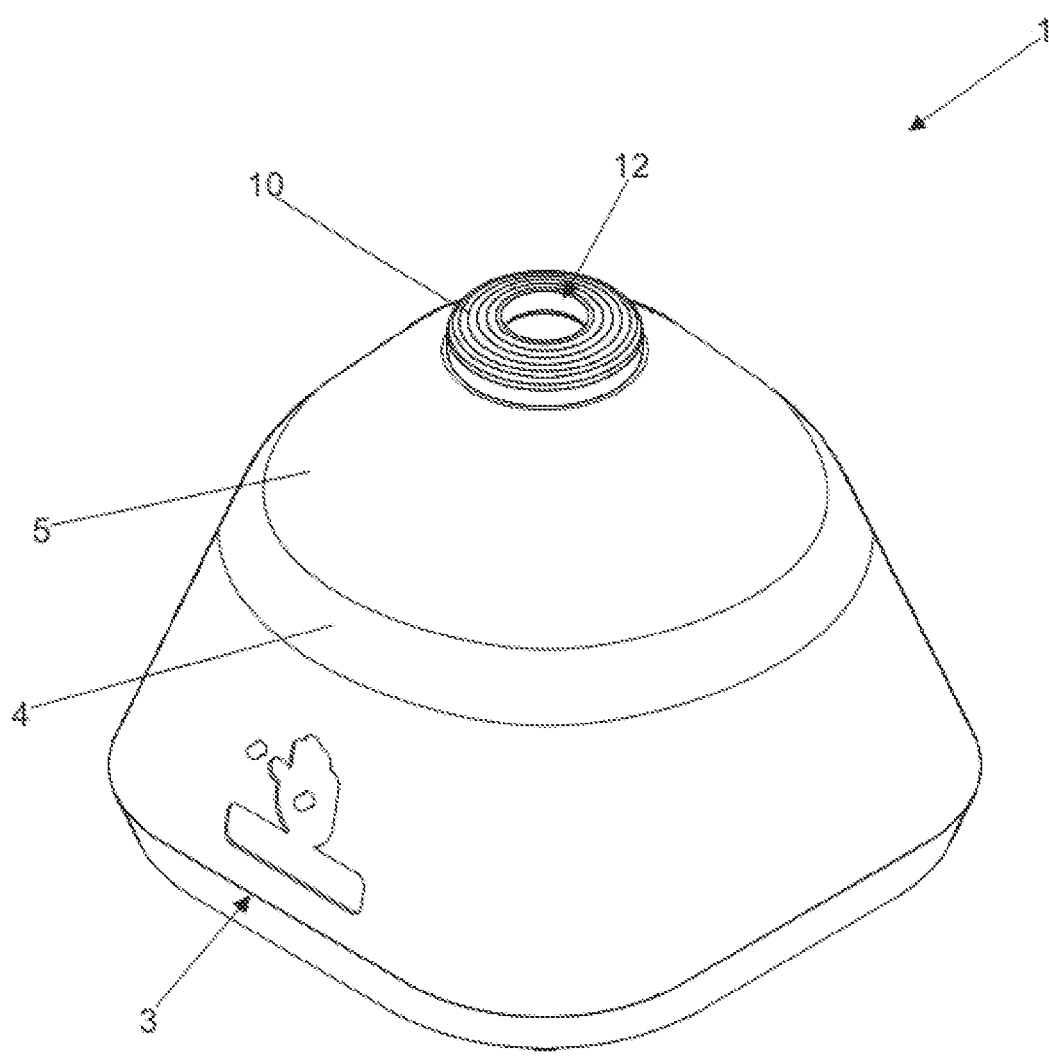
FIG. 1: Perspective view of the palm device for non-invasive collection of biomarkers in human beings.
Figure 2:
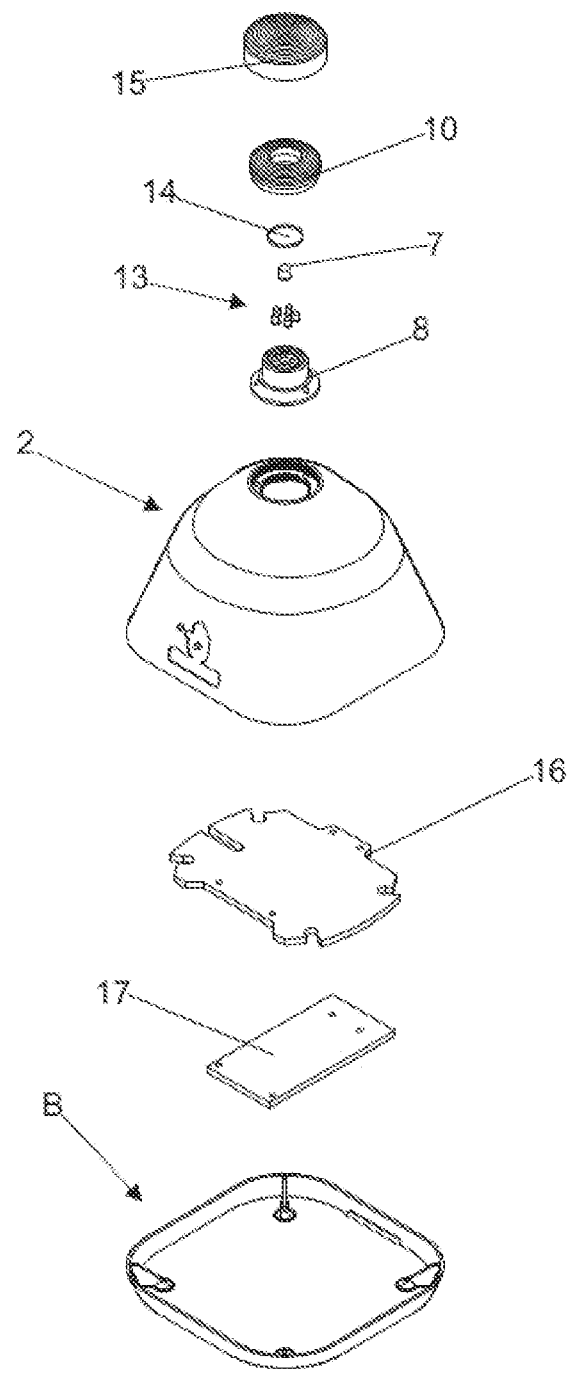
FIG. 2: Blown-up perspective view of the palm device for non-invasive collection of biomarkers in human beings.
Figure 3:
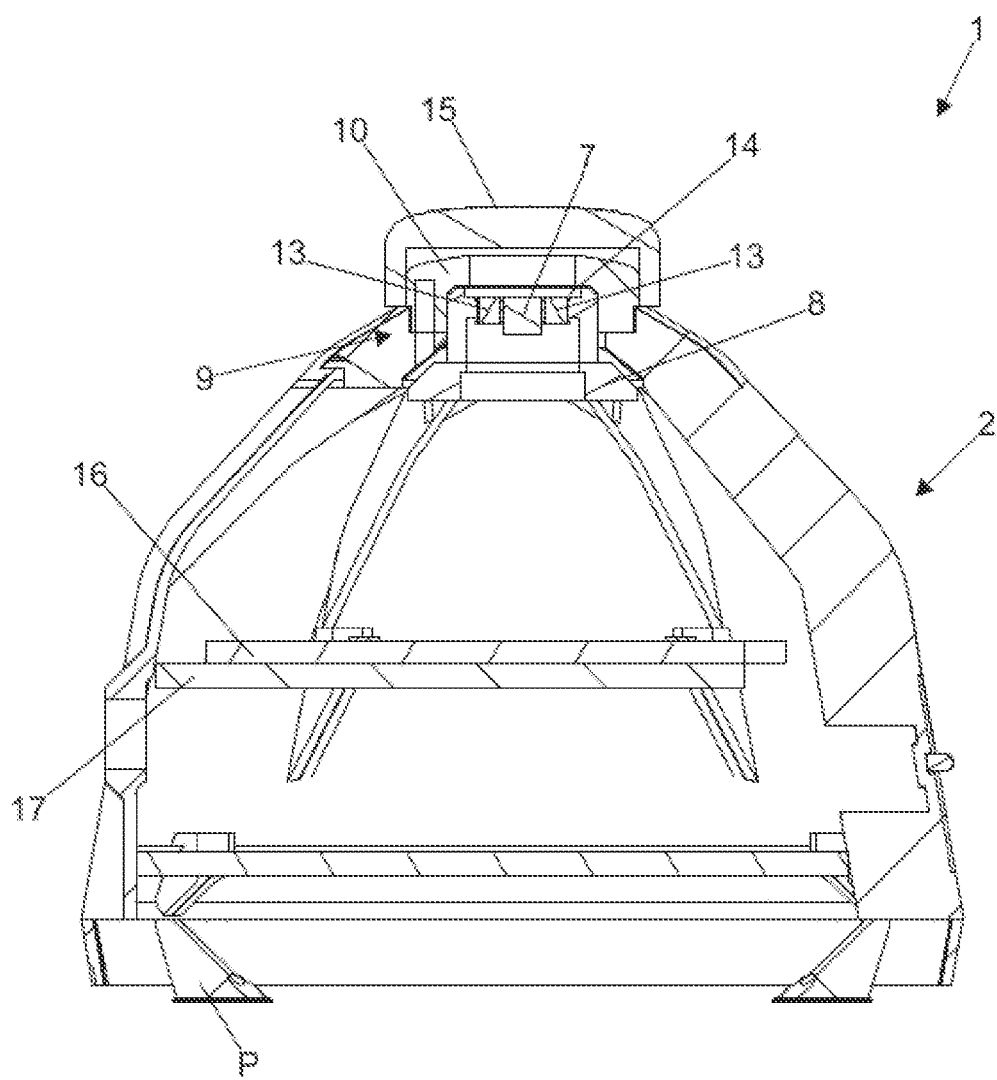
FIG. 3: Cutaway side view of the palm device for non-invasive collection of biomarkers in human beings.
Figure 4:
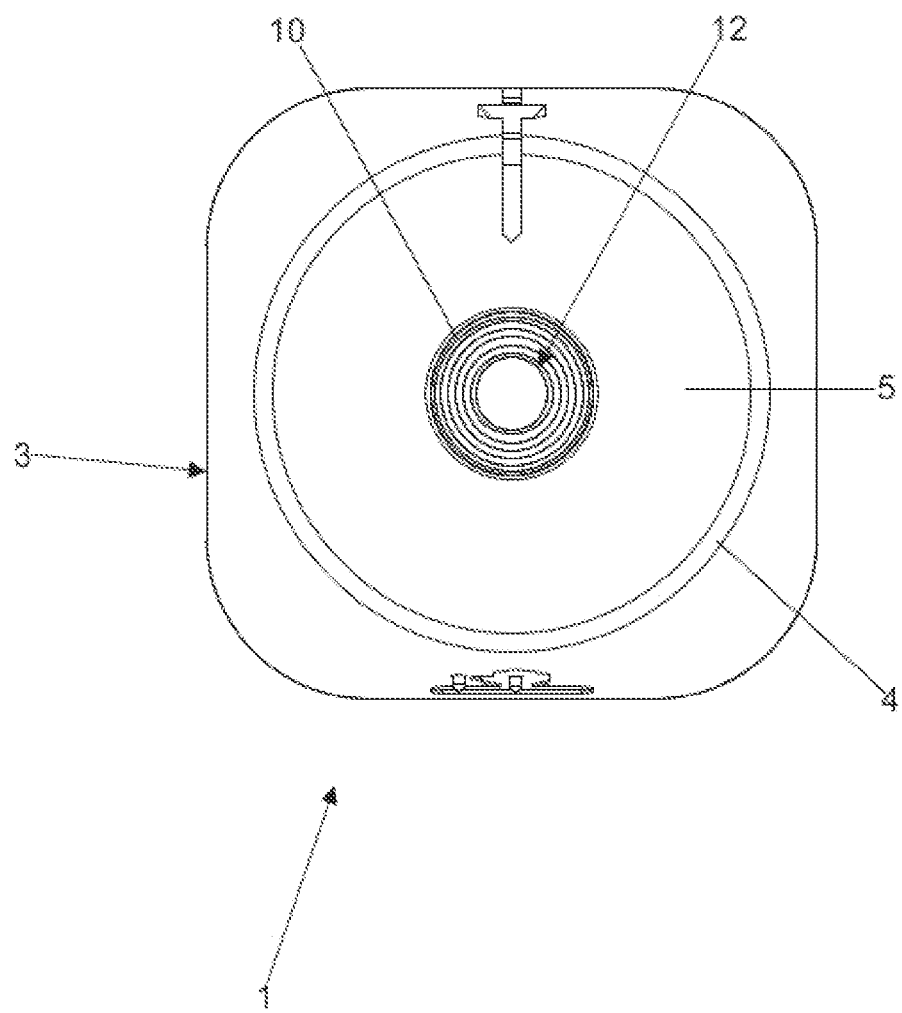
FIG. 4: Top view of the palm device for non-invasive collection of biomarkers in human beings.
Figure 5:
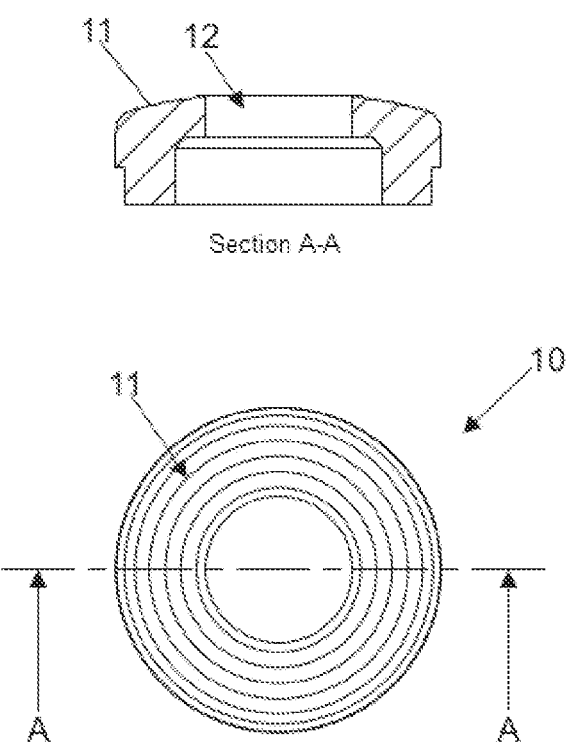
FIG. 5: Top view of the collection adapter of the palm device for non-invasive collection of biomarkers in human beings, with side cutaway detail.
Figure 6:
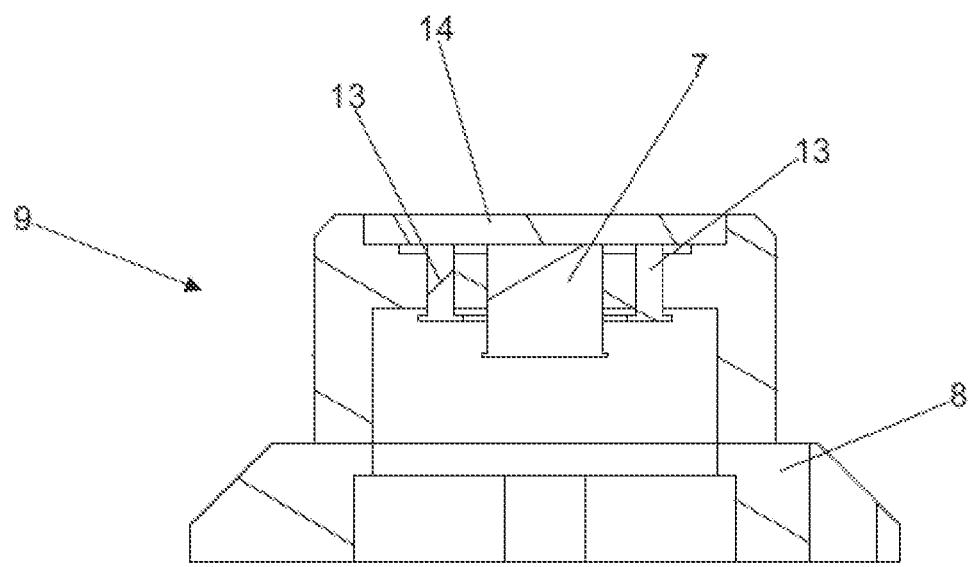
FIG. 6: Side cutaway view of the chamber of the optical system of the collection adapter of the palm collection device.
Figure 7:
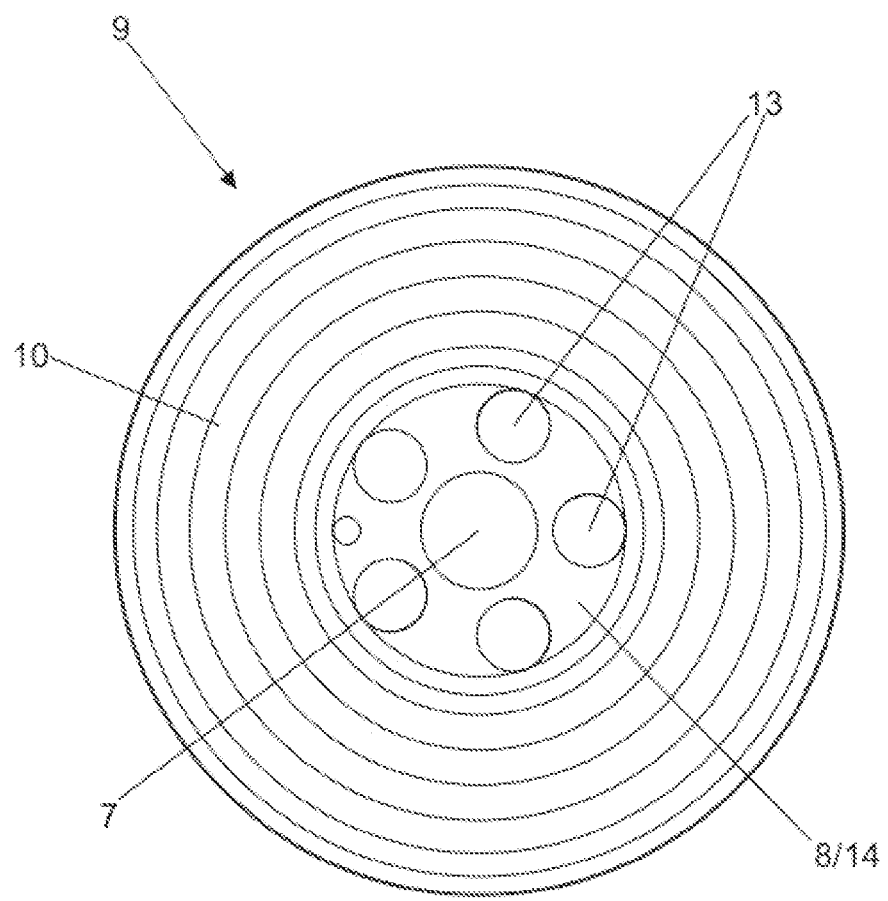
FIG. 7: Top view of the collection adapter of the palm device for non-invasive collection of biomarkers in human beings, with the chamber of the optical system with its components.
Figure 8:
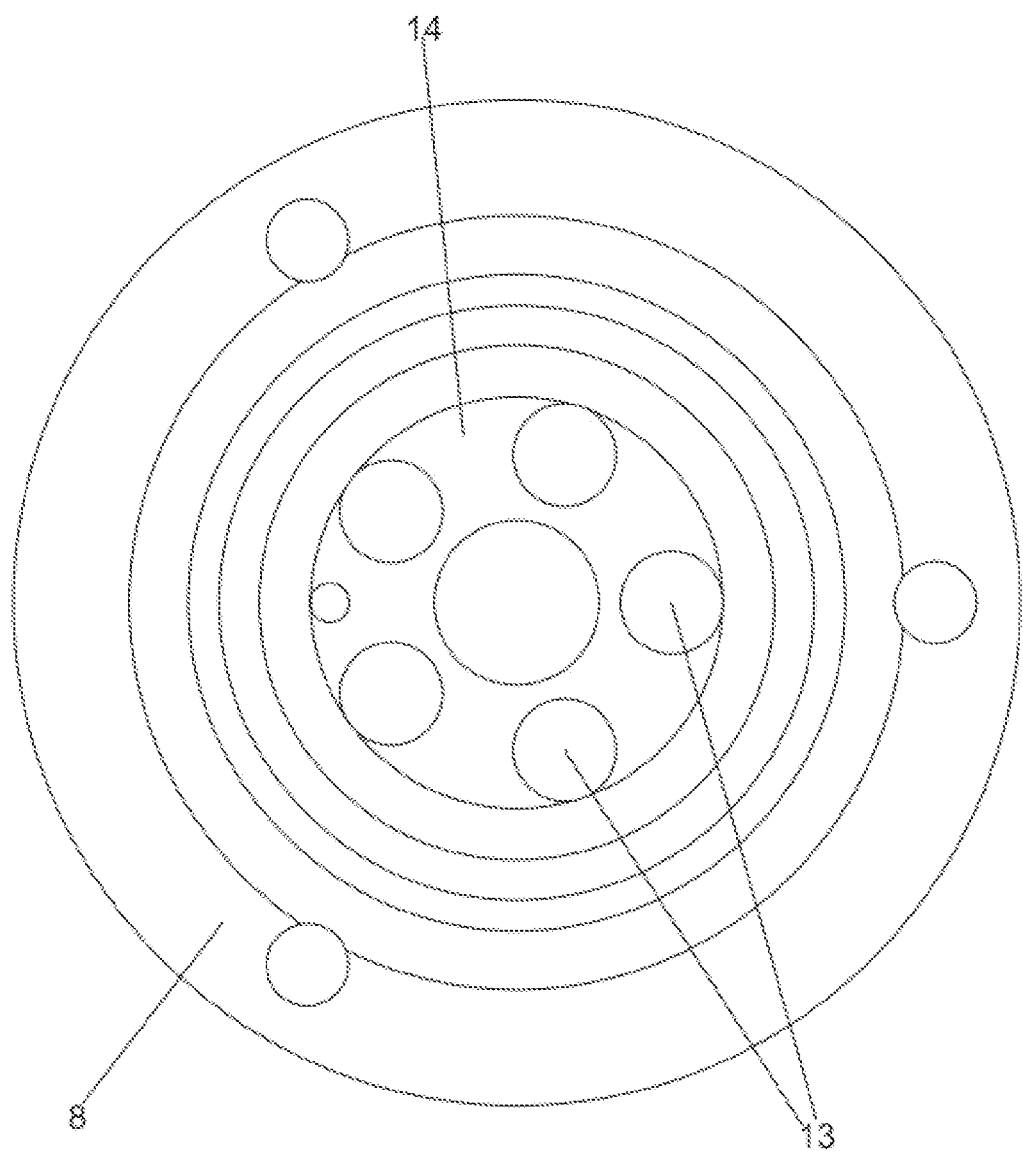
FIG. 8: Top view of the LEDs drum of the collection adapter of the palm device for non-invasive collection of biomarkers in human beings.
Figure 9:
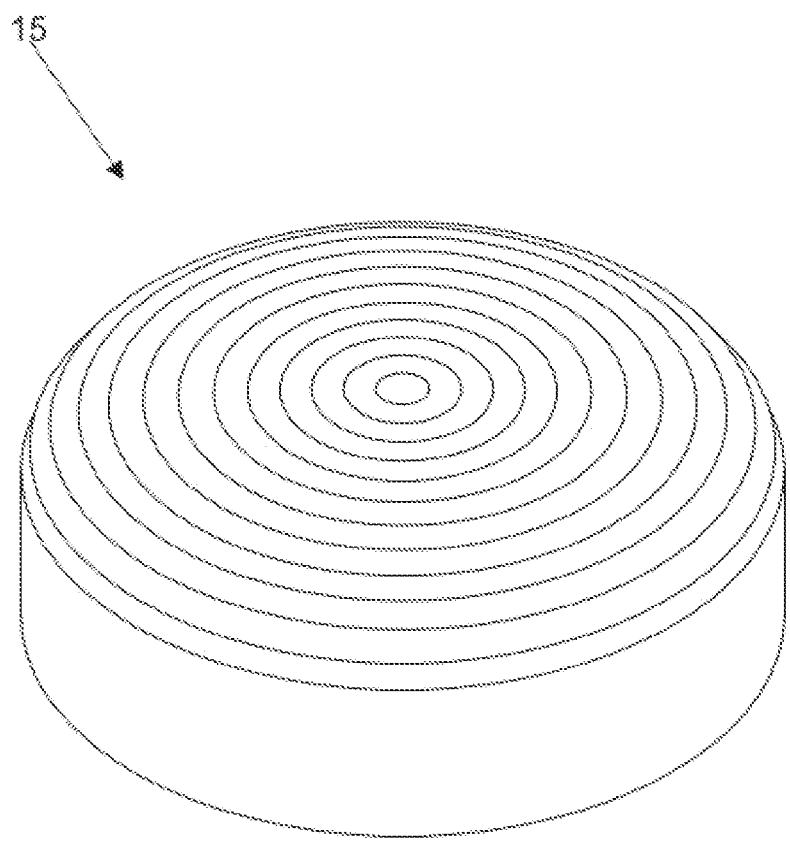
FIG. 9: Perspective view of the lid of the photoelectric sensor of the collection adapter of the palm device for non-invasive collection of biomarkers in human beings.
Figure 10:
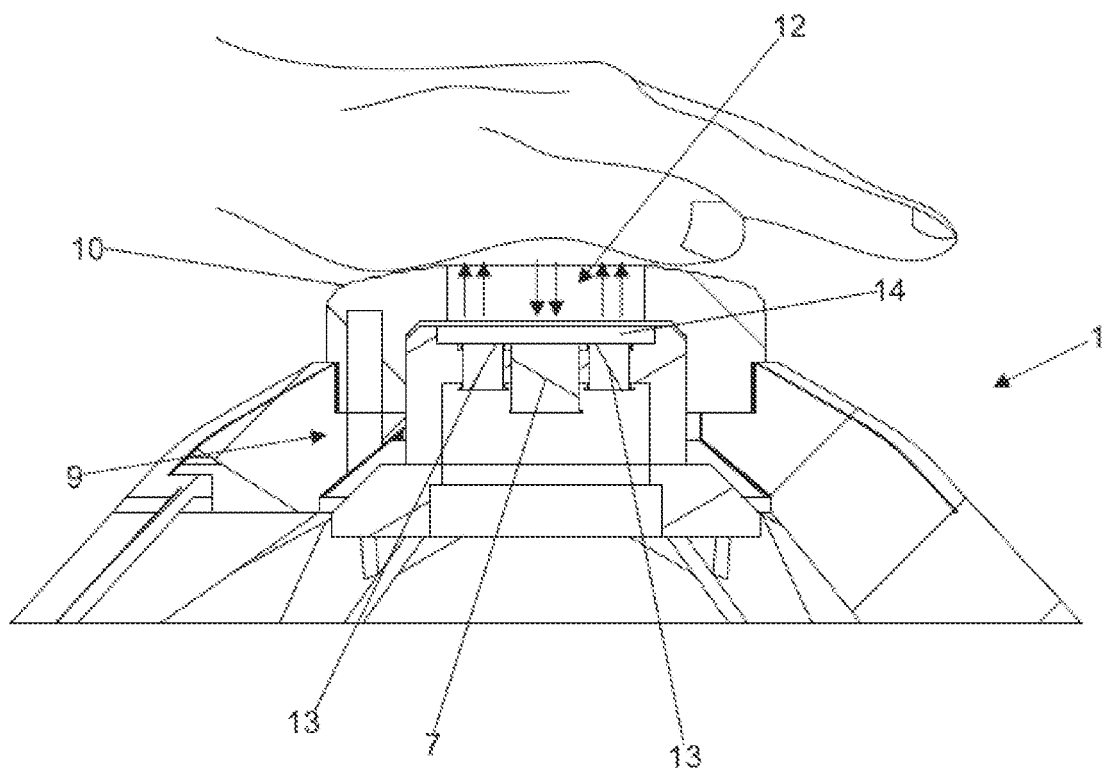
FIG. 10: Side schematic view of the collection adapter of the palm device for non-invasive collection of biomarkers in human beings, showing use.

"PALM DEVICE FOR NON-INVASIVE COLLECTION OF BIOMARKERS IN LIVING BEINGS", refers to a device (1) whose body (2) due to its convex design (5) makes it anatomical with the palm of the hand of the target individual, who will place it on a collection adapter (10) with medium-sized hollow (12), conducive to the blood concentration without interruption of the blood flow, which will be submitted for analysis of biomarkers made in the chamber (9) of the optical system inside the body (2).

More particularly, the invention refers to a device (1) that uses the palm of the hand as a non-invasive data collection point for measuring blood biomarkers of interest. Accordingly, it is mounted in a body (2) that is anatomical with the palm of the hand, the lower perimeter (3) of which is substantially square with rounded corners, whose wall converges at an angle of 45° up to the middle third (4) of its height, from where it forms a convex design (5) up to a central opening (6) concentric to the photoelectric sensor (7) duly fastened on a support (8) in the chamber (9) of the optical system, inside the anatomical body (2). The angles of the upper part of said anatomical body (2) are favorable for fitting the palm of the hand to the collection adapter (10), providing ideal conditions for collecting information from the blood system regardless of the size of the hands and age of the individuals. The anatomical body (2) remains static during collection thanks to non-slip feet (P) located near the finishing edge (B) of the device (1). The collection adapter (10), circular in shape, is encased inside the central opening (6) of the anatomical body (2) keeping the palm of the hand at an ideal distance from the photoelectric sensor (7) and has juxtaposed concave grooves (11) that create a slight blood concentration on the surface thereof, without affecting the flow when the hand of the target individual is on said collection adapter (10), thus preventing blockage of the blood flow during collection. For the analysis to occur, the collection adapter (10) has a medium-sized hollow (12) concentric to the photoelectric sensor (7) and to the set (13) of LEDs, both mounted on the support (8) in the chamber (9) of the optical system, so that the beams of light pass through a lens (14) preceding said medium-sized hollow (12), reach the palm of the hand of the target individual, obtaining the best condition for spectral data collection, and returns to the photoelectric sensor (7) performing the analysis of a given biomarker.

Besides protecting it, the protection lid (15) of the photoelectric sensor (7), embeddable in the collection adapter (10), has a non-invasive calibration system which facilitates the calibration of the device (1) prior to the collections according to the specifications of the operating program, enabling the same device to be used by various individuals. A support (16) for a printed circuit board (17) complements the device (1).

The invention claimed is:

1. A palm device for non-invasive collection of biomarkers in living beings, comprising:
    an anatomical body having a height and a lower perimeter, which from a middle third of its height forms a convex surface up to a central opening concentric to a photoelectric sensor, wherein the lower perimeter is substantially square with rounded corners and the lower perimeter having a wall which converges at an angle of 45° up to the middle third;
    a collection adapter, having a circular opening, being encased inside the central opening and configured to keep the palm of a hand at a distance from the photoelectric sensor, the distance being optimized for spectral data collection, and the collection adapter having juxtaposed concave grooves;
    a chamber in which the photoelectric sensor is mounted on a support and which also houses a set of LEDs whose beams of light pass through a lens preceding the opening and return to the photoelectric sensor; and
    a protection lid of the photoelectric sensor having a calibrator coupled to the protection lid.

\* \* \* \* \*